Oct. 4, 1927.
DE WITT C. HARRIS
1,644,126
FLASH LIGHT CASE
Filed Nov. 12, 1925  4 Sheets-Sheet 1
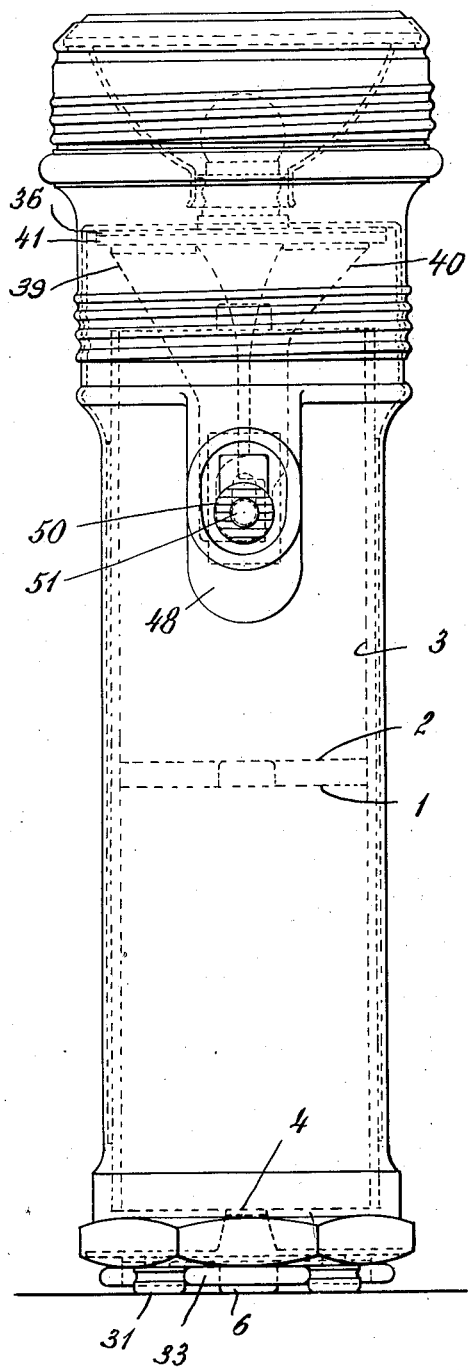
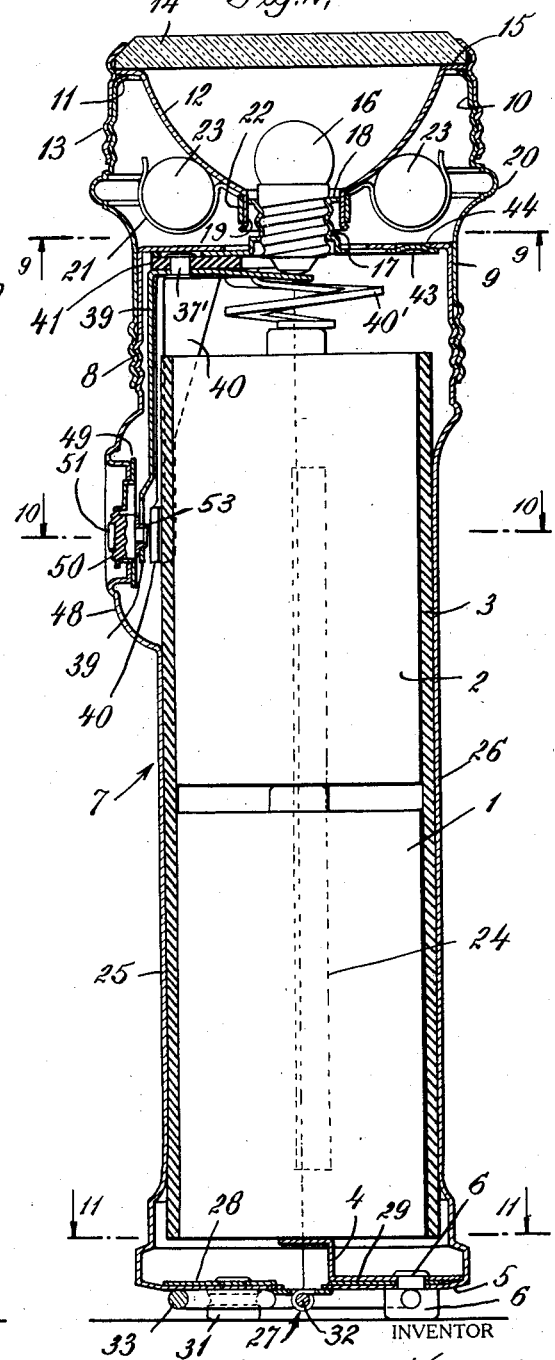
INVENTOR
BY
ATTORNEY Oct. 4, 1927.  
DE WITT C. HARRIS  
1,644,126  
FLASH LIGHT CASE  
Filed Nov. 12, 1925  
4 Sheets-Sheet 2
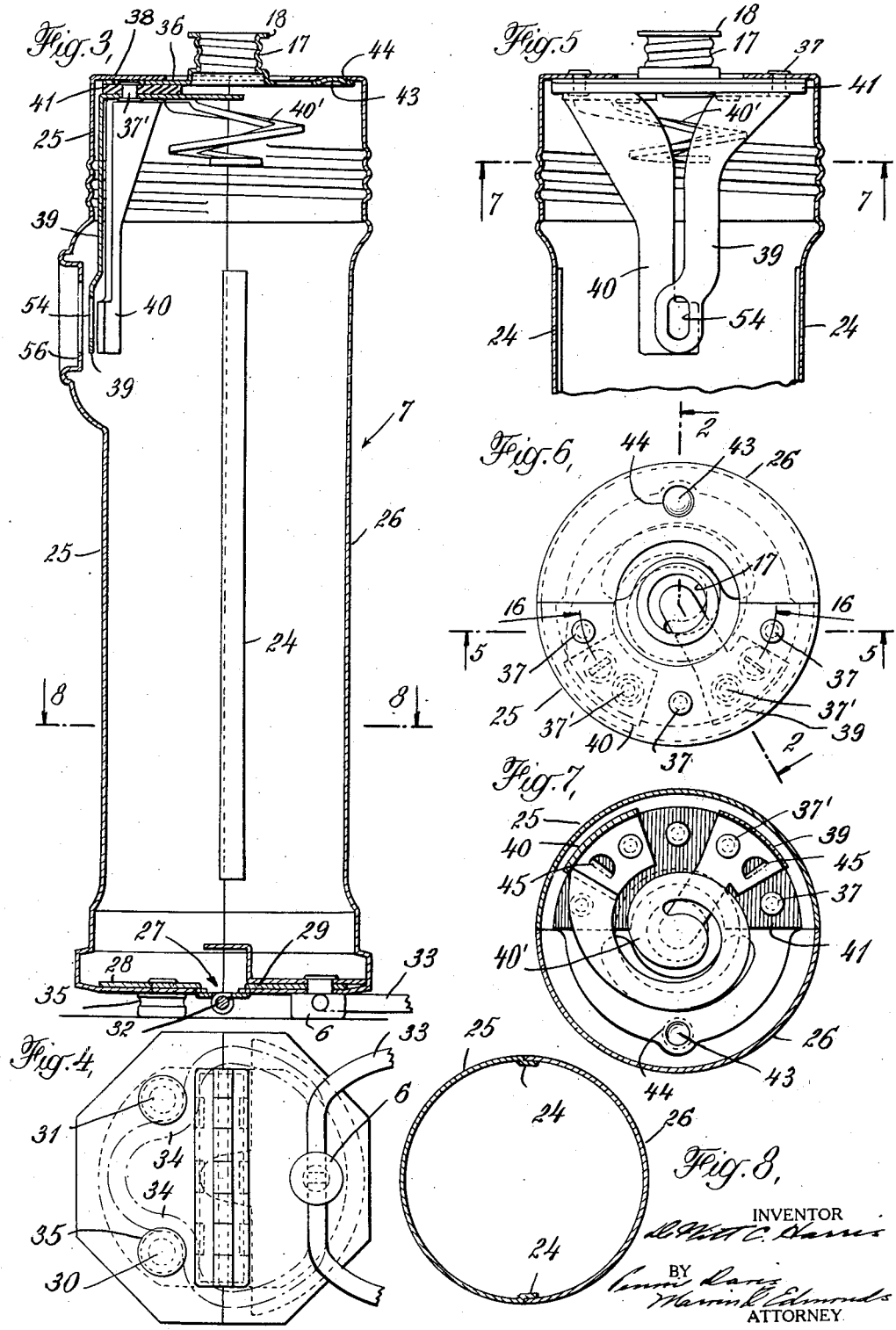

Oct. 4, 1927.
DE WITT C. HARRIS
1,644,126
FLASH LIGHT CASE
Filed Nov. 12, 1925 4 Sheets-Sheet 3
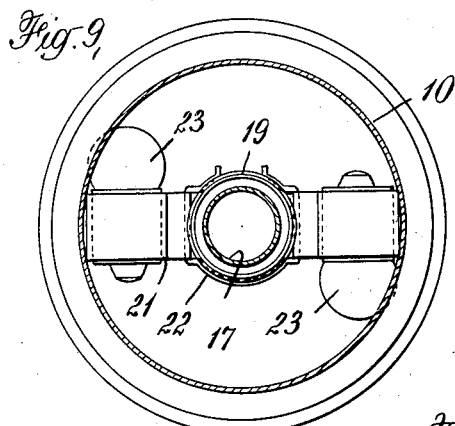
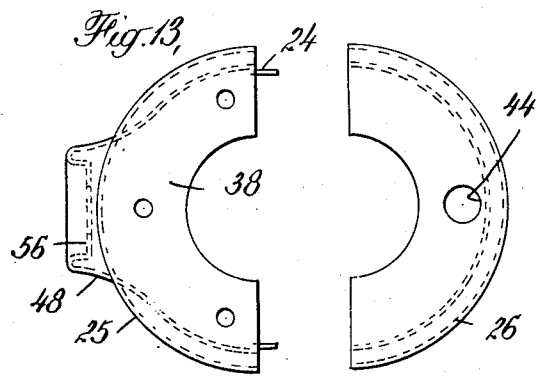
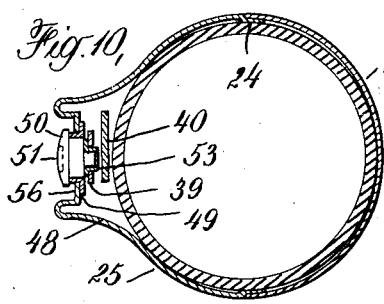
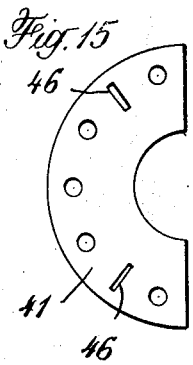
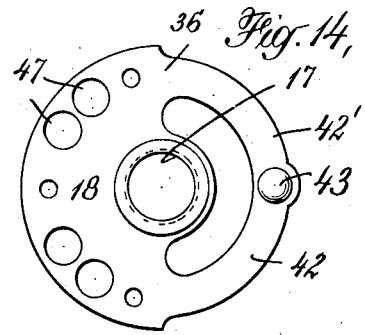
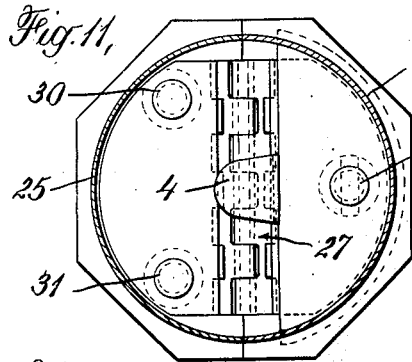
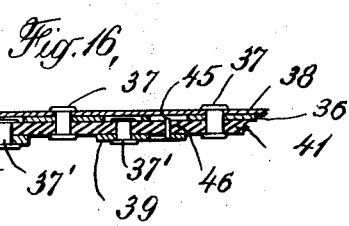
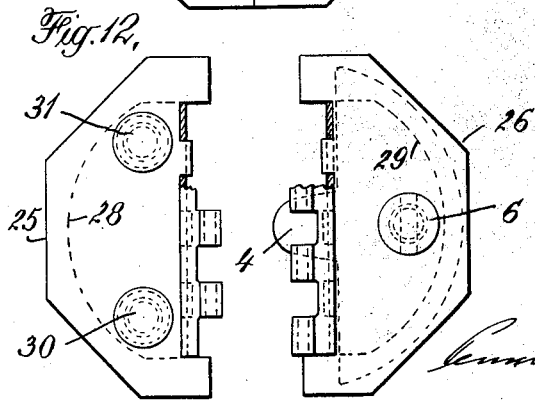
INVENTOR
BY
ATTORNEY Oct. 4, 1927.
DE WITT C. HARRIS
1,644,126
FLASH LIGHT CASE
Filed Nov. 12, 1925     4 Sheets-Sheet 4
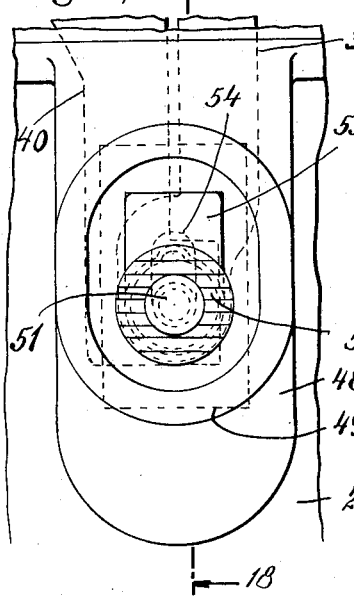
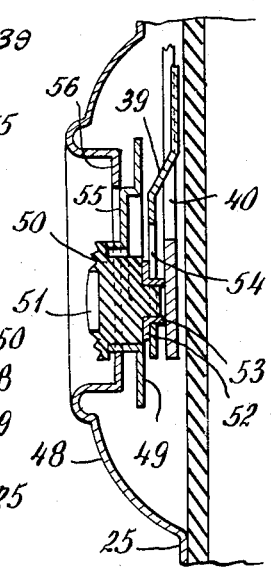
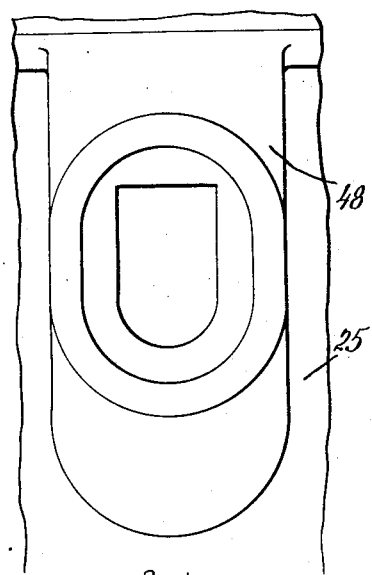
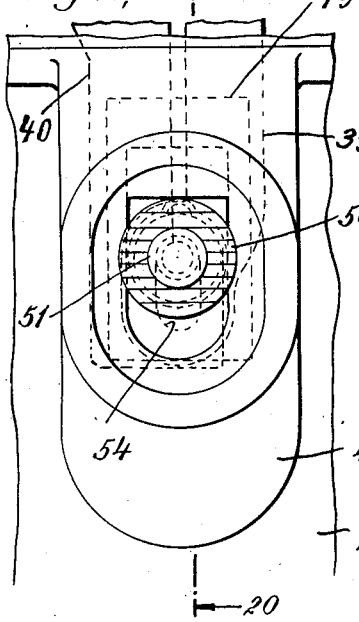
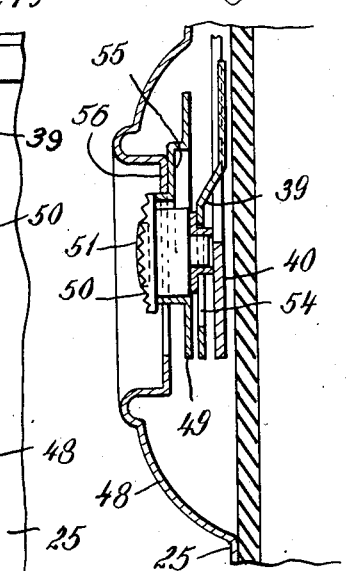
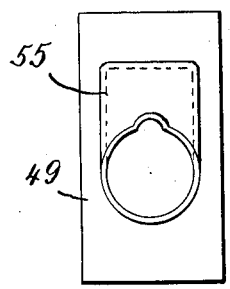
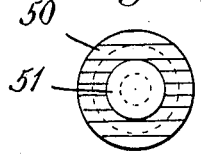
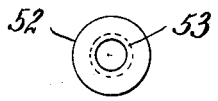
INVENTOR
BY
ATTORNEY Patented Oct. 4, 1927.

1,644,126

UNITED STATES PATENT OFFICE.

DE WITT C. HARRIS, OF PINELAND, FLORIDA, ASSIGNOR TO BURGESS BATTERY COMPANY, OF MADISON, WISCONSIN, A CORPORATION OF WISCONSIN.

FLASH-LIGHT CASE.

Application filed November 12, 1925. Serial No. 68,499.

My invention relates to battery hand lamps, and more particularly, to improvements in battery hand lamp or flash light cases.

One of the principal objects of my invention is to provide a longitudinally split casing such that the two parts of the casing can be readily separated to permit free access to the switch mechanism and to all parts of the inside of the casing.

Another object of the invention is to provide a battery hand lamp so constructed that it easily can be converted for use in directing diffused light or the usual concentrated beam, as occasion may require. The lamp head is constructed so that the reflector, lens and lens retaining ring can be removed from the casing proper as a unit, leaving the lamp bulb in its socket adapted, like the ordinary candle, to distribute light in substantially all directions.

A further object of the invention is to provide means for establishing an electrical connection between the central terminal of the lamp bulb and the central electrode of a dry cell in the casing. This makes it possible to have the lamp socket in direct electrical connection with the hand lamp casing proper. This casing may be in electrical connection with one terminal of the battery.

Among the various improved details forming parts of my invention, may be enumerated the push button having a spot of luminous material thereon, means for hanging the flash light on a support in such a manner that this luminous spot is always visible, and the construction of the lamp head which provides ample space and facilities for carrying spare lamp bulbs.

The various objects and advantages of my invention will be more apparent upon considering the following detailed description which is to be considered in conjunction with the accompanying drawings, in which—

Figure 1 is an elevation of a complete flash light made in accordance with my invention.

Figure 2 is a longitudinal section view of the flash light shown in Figure 1, Figure 2 being taken on line 2—2 of Figure 6.

Figure 3 is a longitudinal section of the flash light casing proper.

Figure 4 is a bottom plan view of the casing shown in Figure 3.

Figure 5 is a fragmentary longitudinal section of the casing shown in Figure 3, Figure 5 being taken on line 5—5 of Figure 6.

Figure 6 is a top plan view of the casing shown in Figure 5.

Figure 7 is a transverse section view of the flash light casing taken on line 7—7 of Figure 5.

Figure 8 is a transverse section view of the casing taken on line 8—8 of Figure 3.

Figure 9 is a transverse section taken on line 9—9 of Figure 2, showing details of construction.

Figure 10 is a transverse section taken on line 10—10 of Figure 2, showing the construction of the switch mechanism and of the casing proper.

Figure 11 is a transverse section view taken on line 11—11 of Figure 2, showing the construction of the bottom end of the casing.

Figure 12 is an elevation of the bottom end of the casing, the two parts being separated and partly cut away to show the construction.

Figure 13 is a view corresponding to Figure 12 but showing the upper end of the casing proper, the two parts of the casing being separated.

Figure 14 is a plan view of the lamp socket and parts associated therewith.

Figure 15 is a plan view of the insulating strip associated with the lamp socket and its support, and Figure 16 is a development in section taken on line 16—16 of Figure 6, showing details of construction.

Fig. 17 is a plan view of the push button and shield enclosing the switch mechanism.

Fig. 18 is a sectional view on line 18 of Fig. 17.

Fig. 19 is a plan view of the push button and shield with the push button in forward position.

Fig. 20 is a sectional view on line 20 of Fig. 19.

Fig. 21 is a plan view of the shield.

Fig. 22 is a plan view of the metal member that carries the push button.

Fig. 23 is a plan view of the push button.

Fig. 24 is a plan view of the contact washer.

In the embodiment of the invention illustrated in the accompanying drawings, the dry cells 1 and 2 of which any suitable number may be provided, are arranged end to end in series relation within a paper tube 3 (see Figure 2). The naked bottom of the lowermost dry cell is electrically connected through a metal strip 4 to a portion 5 of the lower end of the flash light casing. The strip 4 is firmly held in place by a rivet 6.

At the front end of the casing 7, and detachably connected therewith as by the screw-threaded connection 8, is a metal collar 9, with a threaded band 10 at its front edge. The band 10 has an inwardly bent edge 11, which forms a support for a reflector 12. A lens retaining ring 13 serves to clamp a lens 14 against the outwardly turned edge 15 of the reflector 12. The reflector has an opening in the center thereof, large enough to permit the reflector to be slipped over a bulb 16 in a socket 17. This socket has an outwardly turned front edge 18, which slidably engages the neck or opening 19 in the center of the reflector 12. The edge 18 thus serves as a guide for the lamp bulb and insures the proper location of the bulb with respect to the reflector 12.

The portion 20 of the collar 9 is enlarged outwardly to provide space for a spare bulb holder 21 within the lamp head. This enlarged portion 20 also serves to give the lamp head a pleasing appearance. The spare bulb holder 21 comprises a band 22 extending around the neck 19 of the reflector 12 and held in place by the outwardly turned lower edge of the band 19. The holder 21 is provided with one or more retaining loops adapted to receive spare bulbs 23 in the manner indicated in Figures 2 and 9.

The battery casing 7 is split longitudinally throughout the entire length thereof, to form two casing sections 25 and 26. Suitable flanges 24 are formed on section 25 of the casing; these flanges being adapted to fit on the inside of the section 26 of the casing as best shown in Figure 8.

The two sections 25 and 26 of the casing 7 are preferably hinged to each other. This hinged connection may assume any one of a considerable variety of forms but I prefer to employ a hinge connecting the two sections along the dividing line between them at the bottom of the casing. Such a hinge is shown at 27; this hinge being preferably, though not necessarily, of the type that will not come apart when the elements connected by the hinge are swung away from each other.

The hinge 27 comprises two hinge elements 28 and 29 separate from the casing sections 25 and 26 but attached thereto by means of the rivets 6, 30 and 31. The hinge elements 28 and 29 are connected in the usual manner by means of a pin 32. It is to be understood that the hinge elements could, of course, be formed integral with the casing sections 25 and 26, but I have found it quite satisfactory to use separate elements such as those shown at 28 and 29.

The rivets 6, 30 and 31 are of peculiar construction, adapted to perform functions in addition to that of holding various elements together. The rivet 6 has an opening therethrough, adapted to receive a ring 33 by means of which the flash light can be hung up on the wall. This ring 33 is provided with one or more loops 34, adapted to fit into grooves or notches 35, provided in the heads of rivets 30 and 31. Thus when the ring 33 is not being used as a means for hanging the flash light on a suitable support, the ring is snapped in place in the grooves 35.

The lamp socket 17 is fixed to and preferably integral with a plate 36 of substantially circular outline and this plate is, in turn, fixed by the rivets 37, or otherwise, to the front end 38 of section 25 of the casing 7. The socket 17 is thus in electrical connection with the casing 7 and, therefore, with the bottom electrode of the battery inside the casing.

Since the lamp socket 17 is in permanent electrical connection with one terminal of the battery, the flash light is operated by establishing an electrical connection between the central terminal of the lamp bulb and the central electrode of the battery. My improved means for establishing this connection, includes a switch mechanism, hereinafter described, cooperating with two contact strips 39 and 40. Both of these strips are fastened to a semi-circular insulating strip 41, which is firmly secured to the end 38 of the casing section 25 by means of the rivets 37 above mentioned. The contact strip 40 has an arm extending down into close proximity to the switch mechanism, and a portion 40' of this strip is formed in the shape of a helix and makes contact with the central terminal of the battery.

The other contact strip 39 makes contact with the central terminal of the lamp bulb 16. The helical portion 40' of the strip 40 acts as a cushioning device or shock absorber for the central electrode of the uppermost dry cell 2 and effectively prevents this electrode from being forced down through its pitch seal and into the dry-cell, in case the hand lamp is dropped. The upper battery electrode cannot, under any circumstances, come into contact with the central lamp terminal.

The circular plate 36 which carries the lamp socket 17, is provided with means for establishing a snap fastener connection between the two sections of the casing 7. The plate 36 has two integral spring arms 42 and 42' having a raised portion 43 at the point where they come together. This projection 43 is adapted to snap into an opening 44 in the upper end of the casing section 26, to form a snap fastener connection or lock for the two parts of the casing.

The contact strips 39 and 40 and the insulating strip 41 are fastened together in such a manner that the contact strips cannot rotate about the rivets which hold them in place, even though each strip is held by a single rivet. Each contact strip is provided with a lug 45 struck up from the face of the metal and projecting into slots 46 in the insulating strip 41. This holds the strips from turning about the rivets 37'. The circular plate 36 is provided with a number of large openings 47 which receive the heads of the rivets 37' and the lugs 45 and these openings are large enough so that the rivet heads and the lugs 45 do not come in contact with the plate 36.

The switch mechanism includes a raised shield 48 on the section 25 of the casing 7. This shield has an opening therein of greater length than width. One end of this opening is rounded and the other has substantially square corners as shown in Figure 21. A metal piece 49 fits into the opening in the shield from the underside and forms a support for a push button 50, preferably made of insulating material. The center of the exposed face of the push button 50 is provided with a material which will render this spot luminous in the dark. The luminous paint, or its equivalent, can be applied to a depression in the button and then this depression may be filled with a piece 51 of transparent glass or other material. The top of the push button 50 is preferably knurled as shown in Figures 18 and 23, so as to afford a rough surface which can be easily gripped. A washer 52, having a raised collar 53, fits over a projection on the bottom of the push button 50. The collar 53 is adapted to slide back and forth in a slot 54 in the contact strip 39.

When it is desired to make an instantaneous contact between the central terminal of the lamp bulb and the central electrode of the battery, the push button 50 is simply pressed down in the manner shown in Figure 18, so as to connect the two contact strips 39 and 40. In the embodiment shown, this is done through the washer 52, which is brought into electrical contact with the contact strip 40. If it is desired to maintain the switch mechanism in its closed position, the button is pressed down and then pushed forward into the position shown in Figure 20. A raised portion 55 on the metal piece 49 engages the depressed portion 56 of the shield 48 and holds the push button in its innermost position.

When the switch is closed, the circuit through which current is supplied to the lamp bulb, consists of the central electrode of the dry cell 2, the helical portion 40' of the contact strip 40, the arm of the contact strip 40, the washer 52 of the switch mechanism, the contact strip 39, the central terminal of the lamp bulb 16, the lamp filament, the outer terminal of the lamp bulb, the lamp socket 17, the casing 7, the contact strip 4 and the lower terminal of the dry cell 1. There is no possibility of the battery becoming accidentally short-circuited or of the lamp becoming inadvertently lighted by bringing the hand lamp casing into contact with metal. The lamp socket is in direct electrical connection with the hand lamp casing but the circuit through the lamp can only be established by completing a connection between the central terminal of the lamp bulb and the central terminal of the battery in the casing.

My improved flash light is useful for many purposes. It can be used as an ordinary flash light, providing a narrow beam of light and, if it is so desired, the spread of this beam of light can be changed by simply turning the head of the flash light with respect to the main portion of the casing. The lamp bulb is carried by the casing and the reflector by the head and accordingly the relative positions of the bulb and reflector can be altered by turning the lamp head on its screw-threaded support. The lamp head can be removed as a unit without first removing the lamp bulb or disarranging the electrical connections in any manner. Thus, the flash light can be used as a candle, giving diffused light instead of a concentrated beam.

The ring 33 secured to the base of the lamp casing, is arranged in such a manner that when the casing is hung on the wall, the luminous spot on the push button is always visible. Furthermore, it is to be noted that the three rivets 6, 30 and 31 at the base of the lamp casing, form a standard or base for holding the casing in an upright position on a desk or table.

The longitudinally split casing 7 has many advantages over the ordinary type of casing. In the first place, the casing can be spread wide open so as to expose the switch mechanism and permit ready adjustment of any disarranged parts. This construction also makes it possible to remove any dry cells which have become corroded and have adhered to the inner surface of the casing. The casing can be readily cleaned and after a new battery has been put in place, it is merely necessary to snap the two parts of the casing together and the lamp is ready for use.

It is not necessary to adjust any conductors or to even apply the lamp head to the casing before the lamp can be lighted. The lamp is in condition to be lighted just as soon as the two casing sections are brought together. The lamp head may then be screwed on to the upper end of the casing so as to provide a reflector and lens for the lamp.

The two casing sections can be shaped from sheet metal by means of dies and in fact all of the parts which go to make up my improved hand lamp can be manufactured in quantities at low cost. The improved construction not only lends itself readily to quantity production, but it also provides an arrangement of parts such that accidental lighting of the lamp is avoided except under most unusual circumstances. The switch button is shielded by the escutcheon against accidental pressure which might close the lamp circuit. The arrangement is such that the push button supported by the spring finger or support 39 would rarely, if ever, be forced in far enough to close the lamp circuit except when pressure is applied thereto by hand.

I claim:

1. In a battery hand lamp, the combination of a longitudinally split casing comprising two casing sections, a battery, having a longitudinally aligned central electrode, disposed within the casing, a lamp bulb in axial alignment with said casing, a support therefore, two contact strips carried by one casing section and making contact with the central bulb terminal and the central battery electrode respectively, said strips being normally electrically disconnected from each other, and a switch carried by this casing section, adapted to establish an electrical connection between said contact strips.

2. In a battery hand lamp, the combination of a longitudinally split casing comprising two casing sections, a battery having a longitudinally aligned central electrode, disposed within the casing, a lamp bulb in axial alignment with the casing, a support therefor, carried by one casing section, two contact strips carried by this casing section and making contact with the central bulb terminal and the central battery electrode respectively, said strips being normally electrically disconnected from each other, and a switch carried by this casing section, adapted to establish an electrical connection between said contact strips.

3. In a battery hand lamp, the combination of a longitudinally split casing comprising two casing sections, a battery within the casing, a lamp bulb, a support therefor, a spring contact strip engaging the central lamp terminal, a second spring contact strip engaging the central battery electrode and holding the same out of contact with said bulb terminal, insulating means normally separating said contact strips, and switching means for electrically connecting said contact strips, said strips, insulating means and switching means all being carried by one of said casing sections.

4. In a battery hand lamp, the combination of a longitudinally split cylindrical casing comprising two casing sections hinged together at the base of the casing, a battery, having a longitudinally aligned central electrode, disposed within the casing, a lamp bulb in axial alignment with the battery, a support therefor, two contact strips carried by one casing section and making contact with the central bulb terminal and the central battery electrode respectively, said strips being normally electrically disconnected from each other, and a switch carried by this casing section, adapted to establish an electrical connection between said contact strips.

5. A battery hand lamp casing comprising a cylindrical longitudinally split shell comprising two casing sections, a hinge interconnecting said sections at one end of the casing, the other end thereof being provided with screw-threads, and a cylindrical lamp head adapted to be screwed on this threaded end.

6. In a battery hand lamp, the combination of a longitudinally split metal casing comprising two casing sections, a battery, having a longitudinally aligned central electrode, disposed within the casing, a lamp bulb, a support therefor electrically connected to said casing, a spring contact strip engaging the central lamp terminal, a second spring contact strip engaging the central battery electrode, insulating means normally separating said contact strips, and switching means for electrically connecting said contact strips, said strips, insulating means and switching means all being carried by one of said casing sections, and said bulb, battery, and casing all being in axial alignment.

7. In a battery hand lamp, the combination of a casing, a battery therein, a lamp bulb, a metal support for the bulb, an insulating member fixed to said support, two contact strips fixed to one face of said insulating member and insulated from each other thereby, said strips making contact with the central lamp terminal and the central battery terminal respectively, and means for establishing an electrical connection between said contact strips.

8. In a battery hand lamp, the combination of a casing, a battery therein, a lamp bulb, a support therefor, a switch housing on the side of said casing, a contact strip engaging the central electrode of the battery, a second contact strip engaging the central lamp bulb terminal, and a push button within said switch housing, the said strips extending into close proximity to said housing and one of said strips forming a spring support for said push button.

9. A hand lamp casing comprising a longitudinally split cylindrical shell consisting of two casing sections, and a hinge connecting the two sections together at one end, the hinged end of the casing having an external contour other than cylindrical.

10. A hand lamp casing comprising a longitudinally split cylindrical shell consisting of two casing sections having integral end portions, and a hinge connecting said end portions, the hinged end of the casing having an external contour other than cylindrical.

11. In a battery hand lamp, the combination of a lamp bulb, a socket therefor, a longitudinally split casing comprising two casing sections, and a disc fixed to one casing section and to said socket, said disc having a member making a snap fastener connection with the other casing section.

12. In a battery hand lamp, the combination of a lamp bulb, a metal socket therefor, a longitudinally split metal casing comprising two casing sections, and a metal disc fixed to one casing section and integral with said socket, said disc having an integral projection making a snap fastener connection with the other casing section.

13. In a battery hand lamp, the combination of a casing, a lamp bulb, a support therefor carried by the casing, a lamp head, a reflector carried thereby, and a sleeve carried by said reflector adapted to slip over the bulb and its support, the said support having an outwardly turned flange forming a guide ring for centering the bulb in the reflector.

14. In a battery hand lamp, the combination of a casing, a lamp bulb, a support therefor carried by the casing, a lamp head, a reflector carried thereby, and a sleeve carried by said reflector adapted to slip over the bulb and its support, the said support having an outwardly turned flange forming a guide ring for centering the bulb in the reflector, and the said lamp head having screw-threaded engagement with the casing whereby the lamp can be focused by turning the lamp on its support.

15. In a battery hand lamp, the combination of a casing, a lamp bulb, a support therefor carried by the casing, a lamp head, a reflector carried thereby, a sleeve carried by said reflector, adapted to slip over the bulb and its support, and means carried by the reflector for supporting a spare lamp bulb.

16. In a battery hand lamp, the combination of a casing, a lamp bulb, a support therefor carried by the casing, a lamp head, a reflector carried thereby, a sleeve carried by said reflector, adapted to slip over the bulb and its support, a band encircling said sleeve, and means carried by said band for holding a spare lamp bulb.

17. In a battery hand lamp, the combination of a casing, a battery therein, a lamp bulb, a switch housing on the said casing, a pair of contact strips extending from a battery electrode and a lamp terminal respectively, into close proximity to the switch housing, one of said strips having the end thereof bent outwardly forming a spring support extending over the corresponding end of the other contact strip, and a push button carried by said spring support.

18. In a battery hand lamp, the combination of a casing, a battery therein, a lamp bulb, a switch housing on the said casing, a pair of contact strips extending from a battery electrode and a lamp terminal respectively into close proximity to the switch housing, one of said strips having the end thereof bent outwardly forming a spring support extending over the corresponding end of the other contact strip, said support having an opening therethrough, a push button consisting of insulating material, and a metal washer carried by said push button and projecting through the opening in said spring support.

19. In a battery hand lamp, the combination of a casing, a battery therein, a lamp bulb, a switch housing on the said casing, a pair of contact strips extending from a battery electrode and a lamp terminal respectively into close proximity to the switch housing, one of said strips having the end thereof bent outwardly forming a spring support extending over the corresponding end of the other contact strip, said spring support and said housing each having a slot therein, an insulating push button projecting through the slot in said housing, a metal washer carried by said push button and projecting through the slot in said spring support, and a metal piece secured to the push button and having a raised portion adapted to engage the inner face of the slotted portion of said housing when the push button is pressed in and moved along the slot in the housing, whereby the push button is locked in its depressed position.

20. In a battery hand lamp, the combination of a cylindrical casing, a lamp bulb in axial alignment with said casing and at one end thereof, a plurality of rivets secured to the other end thereof and projecting therefrom to form means for supporting the lamp in an upright position, a ring secured to said rivet end of the casing at one side of the axis thereof, whereby the lamp may be suspended bulb downwardly, and a push button on the side of the casing on the other side of the axis of the casing exposed to view and operable in either the upright or suspended position of the lamp, whereby the hand lamp may be employed as a stand lamp or a wall lamp.

21. The combination with a cylindrical hand lamp casing having a closed end, of a ring secured to this end, a rivet head secured to this end and having a groove therein adapted to receive a portion of said ring and hold the same against the casing.

22. The combination with a cylindrical hand lamp casing, having a closed end, of three rivets secured to this end, one of said rivets having an opening through the exposed end thereof, and a ring passing through the opening in this rivet, the other two rivets each having a groove adapted to engage a portion of the ring to hold it against the casing and the three rivets being arranged to form a support for the casing in an upright position.

23. The combination with a cylindrical longitudinally split casing, comprising two sections having end portions integral therewith, of a hinge connecting the said end portions, a rivet in one end portion having a projecting head provided with an opening therethrough, a ring passing through the said opening, a pair of rivets fixed to the other end portion of the casing and having projecting heads provided with grooves adapted to receive portions of the said ring to hold the same against the end of the casing.

In testimony whereof I affix my signature.

D. C. HARRIS.